US012575010B2

(12) United States Patent
Egle et al.

(10) Patent No.: US 12,575,010 B2
(45) Date of Patent: Mar. 10, 2026

(54) FEEDBACK-CONTROLLED SWITCHED CONVERTER FOR A LED LOAD

(71) Applicant: Tridonic GmbH & Co KG, Dornbirn (AT)

(72) Inventors: Manuel Egle, Hohenems (AT); Lukas Saccavini, Dornbirn (AT); Hans Auer, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 60 days.

(21) Appl. No.: 18/724,081

(22) PCT Filed: Jan. 24, 2023

(86) PCT No.: PCT/EP2023/051700
§ 371 (c)(1),
(2) Date: Jun. 25, 2024

(87) PCT Pub. No.: WO2023/148050
PCT Pub. Date: Aug. 10, 2023

(65) Prior Publication Data

US 2025/0063642 A1 Feb. 20, 2025

(30) Foreign Application Priority Data

Feb. 2, 2022 (EP) .................................... 22154663

(51) Int. Cl.
*H05B 45/3725* (2020.01)

(52) U.S. Cl.
CPC ................................ *H05B 45/3725* (2020.01)

(58) Field of Classification Search
CPC ... H05B 45/12; F21V 23/003; F21Y 2113/13; F21Y 2115/10
See application file for complete search history.

(56) References Cited

U.S. PATENT DOCUMENTS

2012/0206064 A1* 8/2012 Archenhold ......... H05B 45/385 315/297
2013/0214697 A1* 8/2013 Archenhold ........... H05B 45/10 315/291

FOREIGN PATENT DOCUMENTS

EP 3054571 A1 * 8/2016 ......... H05B 45/3725
WO 2019168399 A2 9/2019

OTHER PUBLICATIONS

PCT/EP2023/051700, International Search Report and Written Opinion dated Feb. 17, 2023, 7 pages.

* cited by examiner

*Primary Examiner* — Abdullah A Riyami
*Assistant Examiner* — Syed M Kaiser
(74) *Attorney, Agent, or Firm* — Andrus Intellectual Property Law, LLP

(57) ABSTRACT

The invention relates to a feedback-controlled switched converter, comprising: at least one switch, terminals for supplying an LED load, a control unit being supplied with a feedback signal indicating a load current of the LED load. The control unit is configured to: generate an output signal on the basis of the feedback signal, combine the output signal with a periodic modulation signal in order to obtain a control signal, the control signal being configured to set an operation parameter of the at least one switch, apply the control signal to the at least one switch. Moreover, the switched converter comprises means for enabling/disabling the periodic modulation signal, wherein the means for enabling/disabling is configured to enable/disable the periodic modulation signal only at time periods of the periodic modulation signal in which an amplitude of the periodic modulation signal is lower than an amplitude threshold, or wherein the means for enabling/disabling the periodic modulation signal is configured to only enable/disable the (Continued)

periodic modulation signal at first time periods of the periodic modulation signal being centered at zero-crossings of the periodic modulation signal, these first time periods being separated from each other by time periods in which no enabling/disabling of the modulation signal is performed.

15 Claims, 6 Drawing Sheets

FEEDBACK-CONTROLLED SWITCHED CONVERTER FOR A LED LOAD

CROSS REFERENCE TO RELATED APPLICATIONS

The present application is the U.S. national stage application of international application PCT/EP2023/051700 filed Jan. 24, 2023, which international application was published on Aug. 10, 2023 as International Publication WO 2023/148050 A1. The international application claims priority to European Patent Application No. 22154663.3 filed Feb. 2, 2022.

TECHNICAL FIELD OF THE INVENTION

The invention relates to a feedback-controlled switched converter for supplying an LED load. The invention further relates to a method for switching a switched converter for supplying the LED load.

BACKGROUND OF THE INVENTION

Switched-mode power converters (SMPCs), such as LLC converters or buck converters, can be used in electronic devices (such as e.g. LED converter) in order to convert electric power with high efficiency. However, high levels of electromagnetic interference (EMI) can occur in SMPCs. These high levels of EMI can be both conducted and radiated.

Therefore, when designing a SMPC, attention should be payed to the reduction of EMI. In order to reduce the EMI, different techniques can be used, for example, filtering, shielding or soft-switching. Moreover, another technique, the so-called spread-spectrum technique, can be used in order to reduce EMI in SMPCs. Moreover, the suppression of peak EMI levels can also be achieved by the modulation of the switching frequency of the converter, since the switching frequency modulation (SFM) can reduce both conducted and radiated EMI.

However, if the SFM is not done properly in the converter, this can cause a visible flicker in the light output.

Especially, the activation/deactivation of the SFM, when done while the SFM modulation signal is high, can lead to a jump in the operation frequency which can lead to a visible jump in the light output of LEDs supplied by such converter.

Thus, it is an objective to provide for an improved switched converter for a LED load which allows to reduce the EMI and/or the visible flicker in the light output of a supplied LED load.

SUMMARY OF THE INVENTION

The object of the present invention is achieved by the solution provided in the enclosed independent claims. Advantageous implementations of the present invention are further defined in the dependent claims.

According to a first aspect of the invention, a switched converter is provided. The switched converter comprises at least one (preferably one switch or two switches forming a half bridge, or four switches forming a full bridge) switch, terminals for supplying an LED load, and a control unit being supplied with a feedback signal (generated by a feedback signal generating unit) indicating a load current of the LED load. The control unit is configured to generate an output signal on the basis of the feedback signal, combine the output signal with a periodic modulation signal in order to obtain a control signal, the control signal being configured to set an operation parameter of the at least one switch, and apply the control signal to the at least one switch. Moreover, the switched converter comprises means for enabling/disabling the periodic modulation signal, wherein the means for enabling/disabling is configured to enable/disable the periodic modulation signal only at time periods of the periodic modulation signal in which an amplitude of the periodic modulation signal is lower than an (preset) amplitude threshold.

In a preferred embodiment, the means for enabling/disabling the periodic modulation signal is configured to only enable/disable the periodic modulation signal at first time periods of the periodic modulation signal being centered at zero-crossings of the periodic modulation signal, these first time periods being separated from each other by time periods in which no enabling/disabling of the modulation signal is performed.

If an event triggering the enabling/disabling of the modulation signal occurs during time periods/amplitudes during which the enabling/disabling shall not be performed, means are provided for delaying the execution of the enabling/disabling until the next amplitude/time period starts in which the enabling/disabling is allowed.

An event triggering the enabling can be when the load at the output terminals raises (e.g., by dimming) beyond a preset load threshold.

An event triggering the disabling can be when the load at the output terminals drops (e.g., by dimming) below a preset load threshold.

This provides the advantage that enabling/disabling is only performed in amplitude regions/time periods in which the enabling/disabling does only lead to a low or no visible jump in the light output.

In a preferred embodiment, the switched converter further comprises a signal generator, wherein the signal generator is configured to generate the periodic modulation signal.

In another preferred embodiment, the periodic modulation signal is derived from a signal within the converter, such as, e.g., a ripple in the DC supply voltage of the converter.

This provides the advantage that a visible flicker in the output light of the LED is reduced, preferably, eliminated.

In a preferred embodiment, the means for enabling/disabling the periodic modulation signal is configured to detect a maximum amplitude of the periodic modulation signal and wherein the amplitude threshold is less than 10% of the maximum amplitude of the periodic modulation signal.

This provides the advantage that the enable/disable signal is delayed close to the next zero crossing of the periodic modulation signal and, in such a way, there is no significant instantaneous jump in the output signal provided to the LED load. Therefore, the flicker in the output light is advantageously reduced.

In an alternative embodiment, the means for enabling/disabling the periodic modulation signal is configured to detect a change in a sign of the modulation signal. The change enable/disable signal thus is delayed until the next zero-crossing event of the modulation signal and will be executed upon detection of the zero-crossing.

In particular, the means for enabling/disabling the periodic modulation signal is configured to detect the change in the sign by detecting that the sign of the measured signal or modulation signal changes from positive to negative values, or vice versa, during the crossing of the zero point. Since a digital evaluation of the signals is performed (sensing by an analog-to-digital converter (ADC) and digital processing of the signals) such evaluation is, advantageously, easy to implement.

In a preferred embodiment, the periodic modulation signal is a triangle waveform or a sinusoidal waveform.

This provides the advantage that the suppression of peak EMI levels can be achieved by the modulation of switching frequency by making use of periodic modulating waveforms, such as sine, triangle or saw-tooth, therefore, spreading the spectrum of SMPC voltages and currents.

In a preferred embodiment, wherein the periodic modulation signal is based on an inverted input voltage of the switched converter.

This provides the advantage that a flicker in the output light of the LED is significantly reduced.

In a preferred embodiment, the operation parameter of the switched converter, such as a switching frequency or a peak current value of the switched converter, is configured to determine a power provided at the terminals for supplying the LED load.

In a preferred embodiment, the control unit comprises a proportional integral, PI, regulator.

This provide the advantage that well-known regulators, such as PI regulators, can be used.

In a preferred embodiment, the converter is an LLC converter, a flyback converter or a buck converter.

This provides the advantage that well-known converters can be used, thus facilitating the implementation of this embodiment of the invention.

According to a second aspect, a LED lighting means is provided. The LED lighting means comprises the switched converter of the first aspect and any one of the implementation forms thereof and a LED load connected to output terminals of the switched converter.

According to a third aspect, a method for switching a switching converter for supplying a LED load is provided. The method comprises the following steps: supplying a control unit with a feedback signal indicating a load current of the LED load; generating an output signal on the basis of the feedback signal; combining the output signal with a periodic modulation signal in order to obtain a control signal, the control signal being configured to set an operation parameter of the at least one switch; applying the control signal to at least one switch of the switched converter; and enabling/disabling the periodic modulation signal only at time periods in which an amplitude of the periodic modulation signal is lower than an amplitude threshold at first time periods of the periodic modulation signal being centered at zero-crossings of the periodic modulation signal, these time periods being separated from each other by time periods in which no enabling/disabling of the modulation signal is performed.

In an alternative embodiment, the means for enabling/disabling the periodic modulation signal is configured to detect a change in a sign of the modulation signal. The change enable/disable signal thus is delayed until the next zero-crossing event of the modulation signal and will be executed upon detection of the zero-crossing.

In particular, the means for enabling/disabling the periodic modulation signal is configured to detect the change in the sign by detecting that the sign of the measured signal or modulation signal changes from positive to negative values, or vice versa, during the crossing of the zero point.

In a preferred embodiment, the method further comprises the step of generating the periodic modulation signal by a signal generator in the switched converter.

In a preferred embodiment, the method further comprises the step of deriving the periodic modulation signal from a signal within the converter, such as e.g. a ripple in the dc supply voltage of the switched converter.

In a preferred embodiment, the method further comprises the step of detecting a maximum amplitude of the periodic modulation signal, wherein the amplitude threshold is less than 10% of the maximum amplitude of the periodic modulation signal.

In a preferred embodiment, the periodic modulation signal is a triangle waveform or a sinusoidal waveform.

The method according to the third aspect and the implementation forms thereof provide the same advantages as the switched converter of the first aspect and the implementation forms thereof.

BRIEF DESCRIPTION OF THE DRAWINGS

The invention will be explained in the followings together with the figures.

DETAILED DESCRIPTION OF THE PREFERRED EMBODIMENTS

Figure 1:
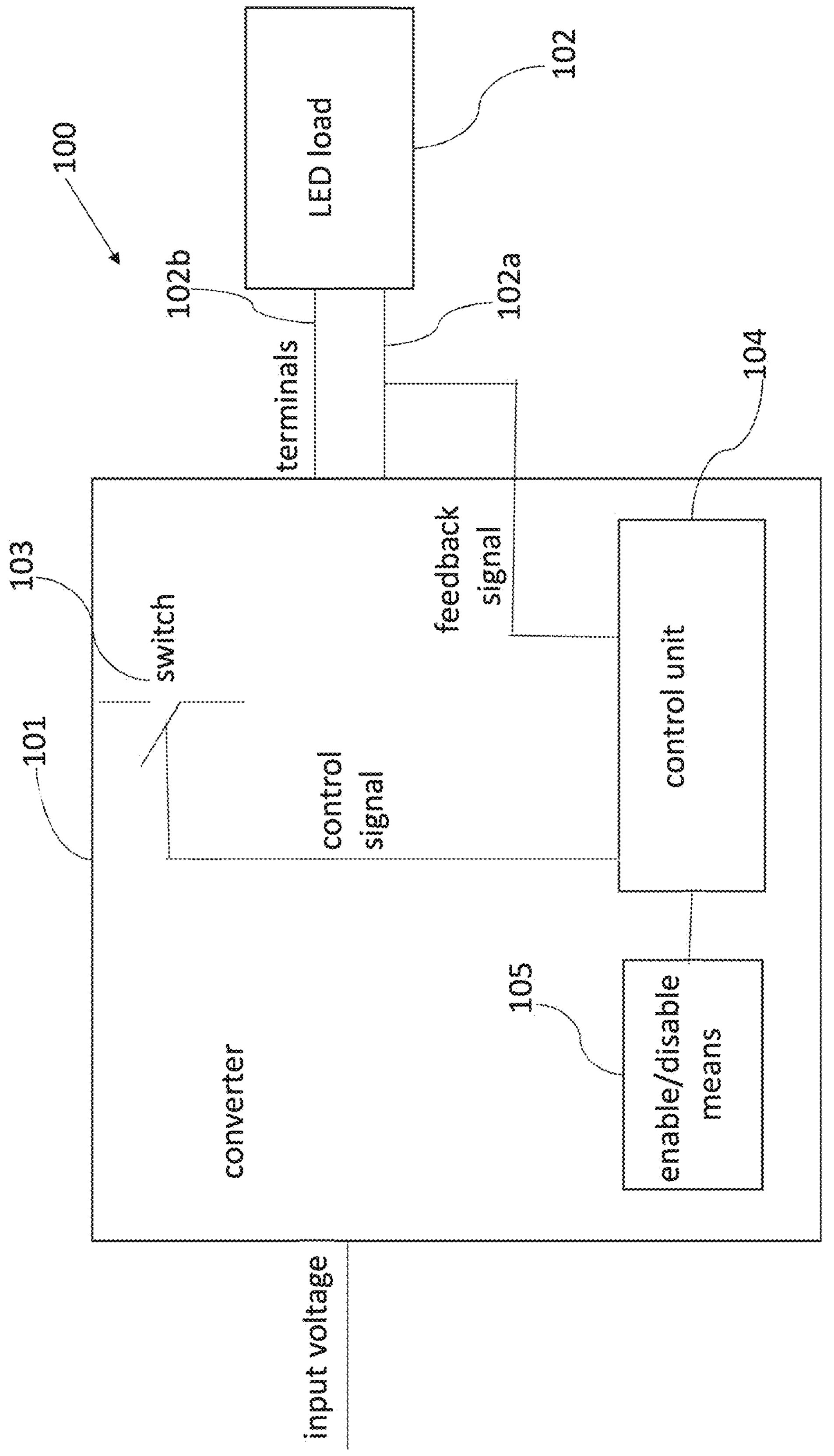
FIG. 1 shows a schematic representation of a LED lighting means comprising a switched converter according to an embodiment of the invention.

Aspects of the present invention are described herein in the context of a switched converter.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Now referring to FIG. 1, a schematic representation of a LED lighting means 100 comprising a switched converter 101 is shown according to an embodiment of the invention.

The LED lighting means comprises the switched converter 101 and the LED load 102, wherein the LED load 102 is connected to the switched converter 101 by means of the supplying terminals 102_a_ and 102_b_.

The switched converter 101 comprises at least one switch 103, the terminals 102*a*, 102*b* for supplying the LED load 102, and a control unit 104 being supplied with a feedback signal indicating a load current of the LED load 102. The control unit 104 is configured to generate an output signal on the basis of the feedback signal, combine the output signal with a periodic modulation signal in order to obtain a control signal, the control signal being configured to set an operation parameter of the at least one switch 103, apply the control signal to the at least one switch 103.

Moreover, the switched converter 101 comprises an enable/disable means 105 for enabling/disabling the periodic modulation signal, wherein the means for enabling/disabling 105 is configured to enable/disable the periodic modulation signal only at time periods of the periodic modulation signal in which an amplitude of the periodic modulation signal is lower than an amplitude threshold.

The means for enabling/disabling 105 the periodic modulation signal may be configured to only enable/disable the periodic modulation signal at separated time periods of the periodic modulation signal being centered at zero-crossings of the periodic modulation signal.

The means for enabling/disabling 105 may be supplied with a signal indicating the current amplitude or the phase of the modulation signal e.g. in order to delay any enabling/disabling action until the next amplitude.

In an alternative embodiment, the means for enabling/disabling the periodic modulation signal is configured to detect a change in a sign of the modulation signal. The change enable/disable signal thus is delayed until the next zero-crossing event of the modulation signal and will be executed upon detection of the zero-crossing.

In particular, the means for enabling/disabling the periodic modulation signal is configured to detect the change in the sign by detecting that the sign of the measured signal or modulation signal changes from positive to negative values, or vice versa, during the crossing of the zero point. Since a digital evaluation of the signals is performed (sensing by an analog-to-digital converter (ADC) and digital processing of the signals) such evaluation is, advantageously, easy to implement.

The switched converter 101 can be, for example, an LLC resonant converter, a flyback converter or a buck converter.

In general, these switched converters can be feedback controlled, such that the feedback signal is fed to the control unit 104, such as for example a PI regulator, which correspondingly (i.e., applying a control algorithm) issues the output signal on the basis of which, for example, the frequency (or the switch off threshold of a current through the switch) of the switched converter 101 can be set. In order to improve the performance of the switched converter 101, it can be foreseen that the output signal of the control algorithm or control unit 104 is combined with another signal, i.e. the periodic modulation signal, and the combined frequency signal or control signal is actually used for setting the switching frequency of the switched converter 101.

Figure 2:
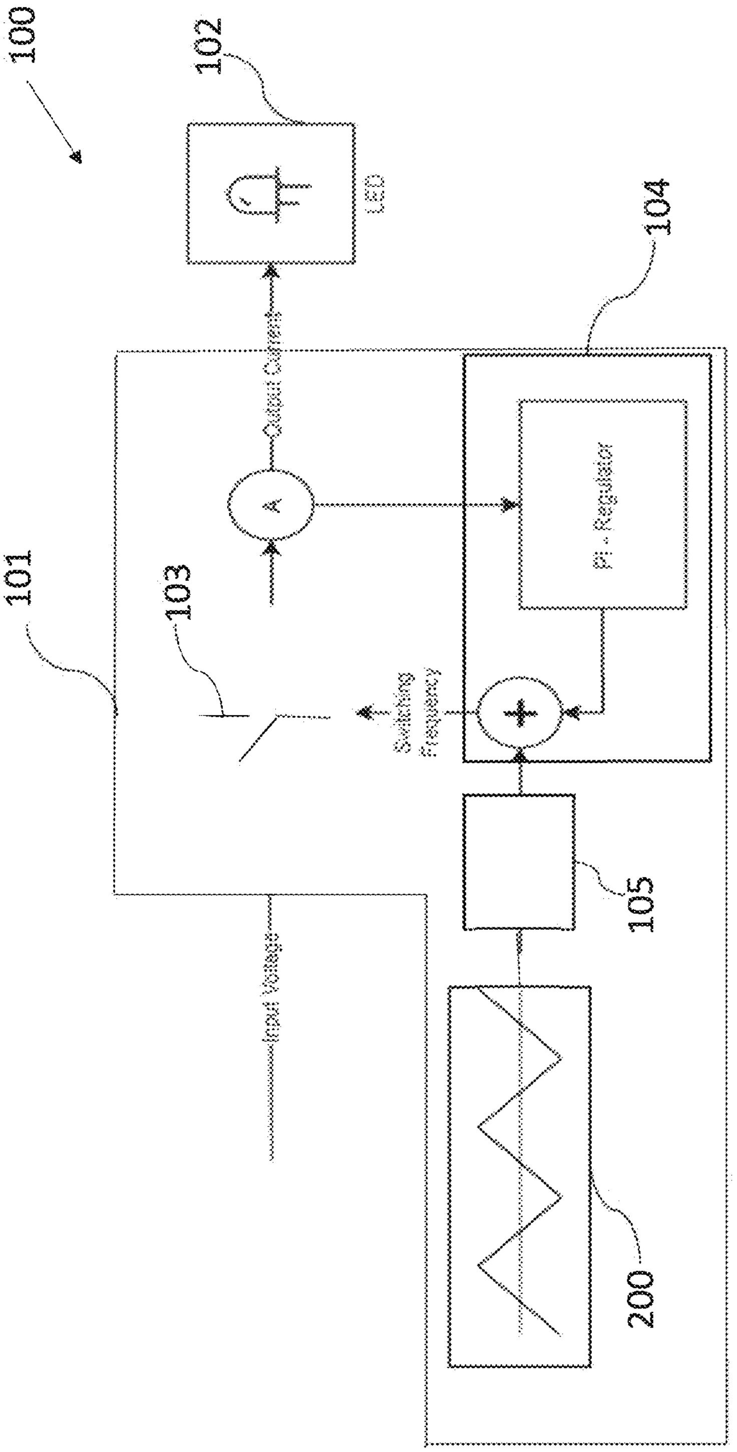
FIG. 2 shows a schematic representation of a LED lighting means comprising a switched converter according to an embodiment of the invention.

FIG. 2 shows a schematic representation of the LED lighting means 100 comprising the switched converter 101 according to an embodiment of the invention.

In the example shown in FIG. 2, the switched converter 101 further comprises a signal generator 200, which is configured to generate the periodic modulation signal. In this example, the periodic modulation signal is a triangle waveform. This provides the advantage that the performance of the switched converter 101 is improved by reducing the EMI. In fact, by making use of the triangle waveform, the power is spread over a wider frequency range.

In other examples, the periodic modulation signal can be a sinusoidal waveform.

Moreover, in the example shown in FIG. 2, the operation parameter of the switched converter 101 is a switching frequency of the switched converter 101, and it is configured to determine a power provided at the terminals 102*a*, 102*b* for supplying the LED load 102.

Therefore, FIG. 2 shows the combination of the output signal of control unit 104, in this example, a PI regulator, with a periodic triangular-shaped artificially generated signal, which leads to a correspondingly periodic modulation of the operation frequency of the switched converter 101. This approach is, typically, used to have a modulation of the switching frequency of the switched converter 101 (in contrast to a non-varying frequency) in order, thus, to improve (broaden) the EMI spectrum.

Moreover, in this embodiment, the control signal directly sets the switching frequency of the switched converter 101.

Figure 3:
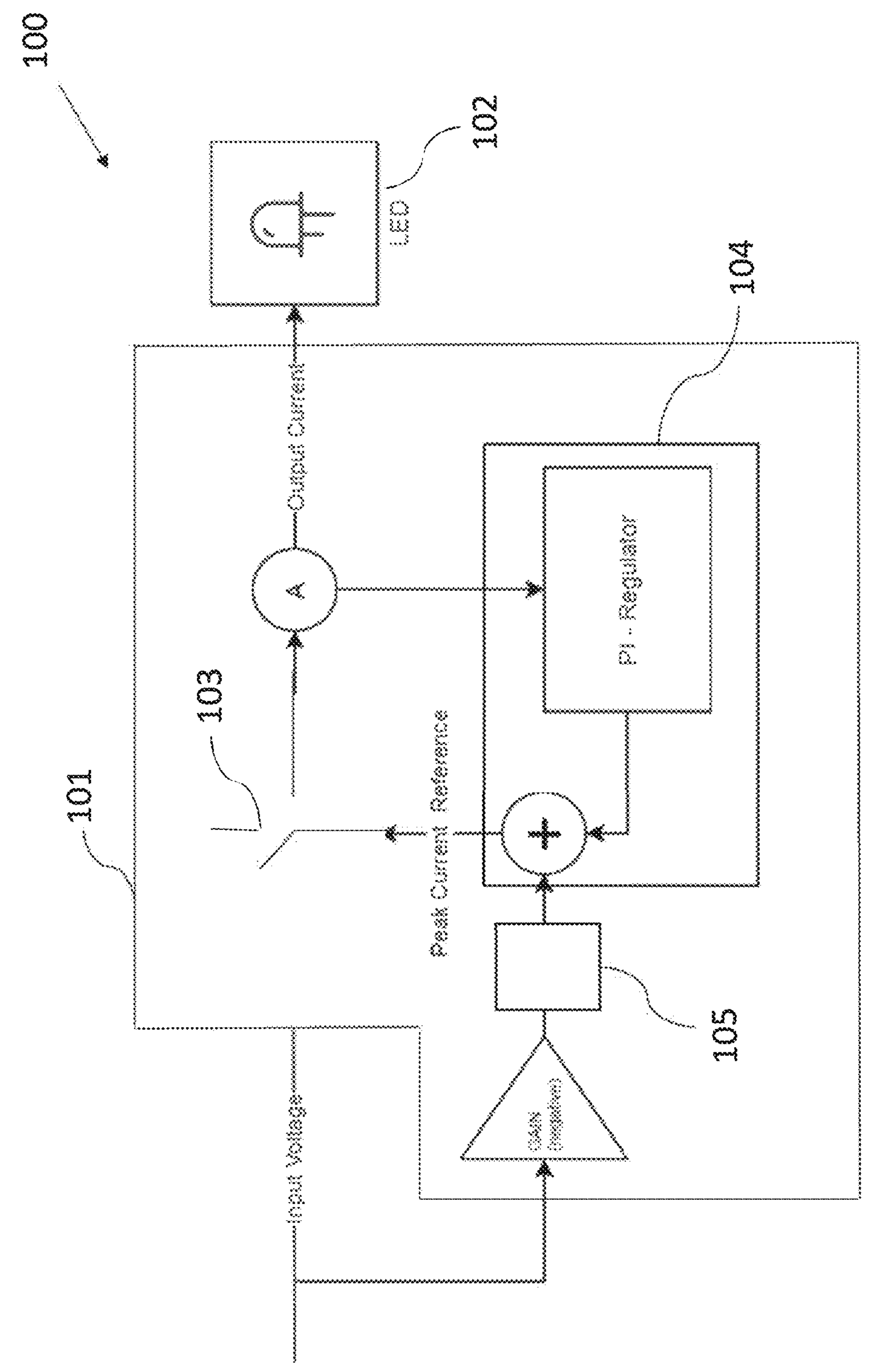
FIG. 3 shows a schematic representation of a LED lighting means comprising a switched converter according to an embodiment of the invention.

FIG. 3 shows a schematic representation of the LED lighting means 100 comprising the switched converter 101 according to an embodiment of the invention.

In FIG. 3 an implementation of the switched converter 101 is shown in which any ripple in the input voltage is reduced, in case the control unit 104 might not be able to compensate for it. To this regard, an inverted signal of the input ripple of the input DC voltage is added to the output signal of the PI regulator, and the, thus, combined signal or control signal is fed to the switched converter 101. This provides the advantage that the power supply rejection ratio (PSRR) is increased.

The output signal of the PI regulator can directly set the switching frequency (FIG. 2) or indirectly set the frequency by setting thresholds (FIG. 3, in which the peak reference switch-off current through the at least one switch 103 of the switched converter 101 is set by the PI regulator).

Therefore, the control unit 104 can issue a signal setting a switching frequency or can issue a signal setting directly or indirectly a switch-off threshold (in which case the switching frequency might be constant).

Figure 4:
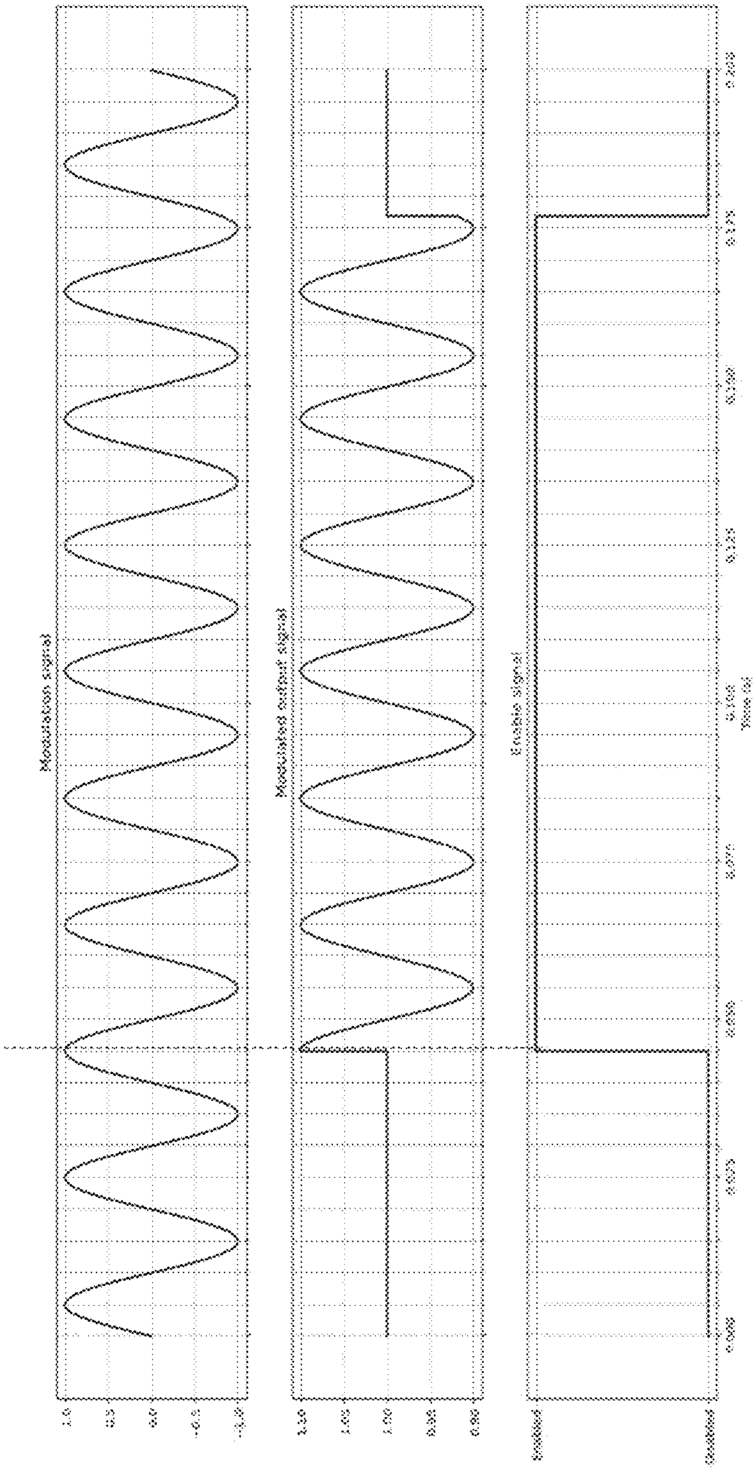
FIG. 4 shows a schematic representation of a modulation signal, a modulated signal and an enable/disable signal according to prior art.

FIG. 4 shows a schematic representation of a modulation signal, a modulated signal, and an enable/disable signal according to prior art.

Both scenarios shown in FIG. 2 and FIG. 3 can lead to the problem that in case the artificial modulation of the frequency or switch-on timing of the switched converter 101 is selectively switched on/off (for example, only enabled at low loads), at the time of enabling or disabling, the periodic modulation signal does not necessarily have a small or zero amplitude, as shown in FIG. 4. In FIG. 4, an example of modulation signal (upper panel), of modulated output signal (middle panel), and enable/disable signal (lower panel) are shown according to prior art. As it can be taken from FIG. 4, the enabling/disabling performed at the peak of the sinusoidal waveform of the modulation signal leads directly to a jump in the modulated signal and, therefore, operation parameter of the switched converter 101 (frequency, switch-on timing, etc.). This is, typically, directly translated in the resulting light output, such that the enabling/disabling of the modulation signal may lead to a visible jump in the light output.

Figure 5:
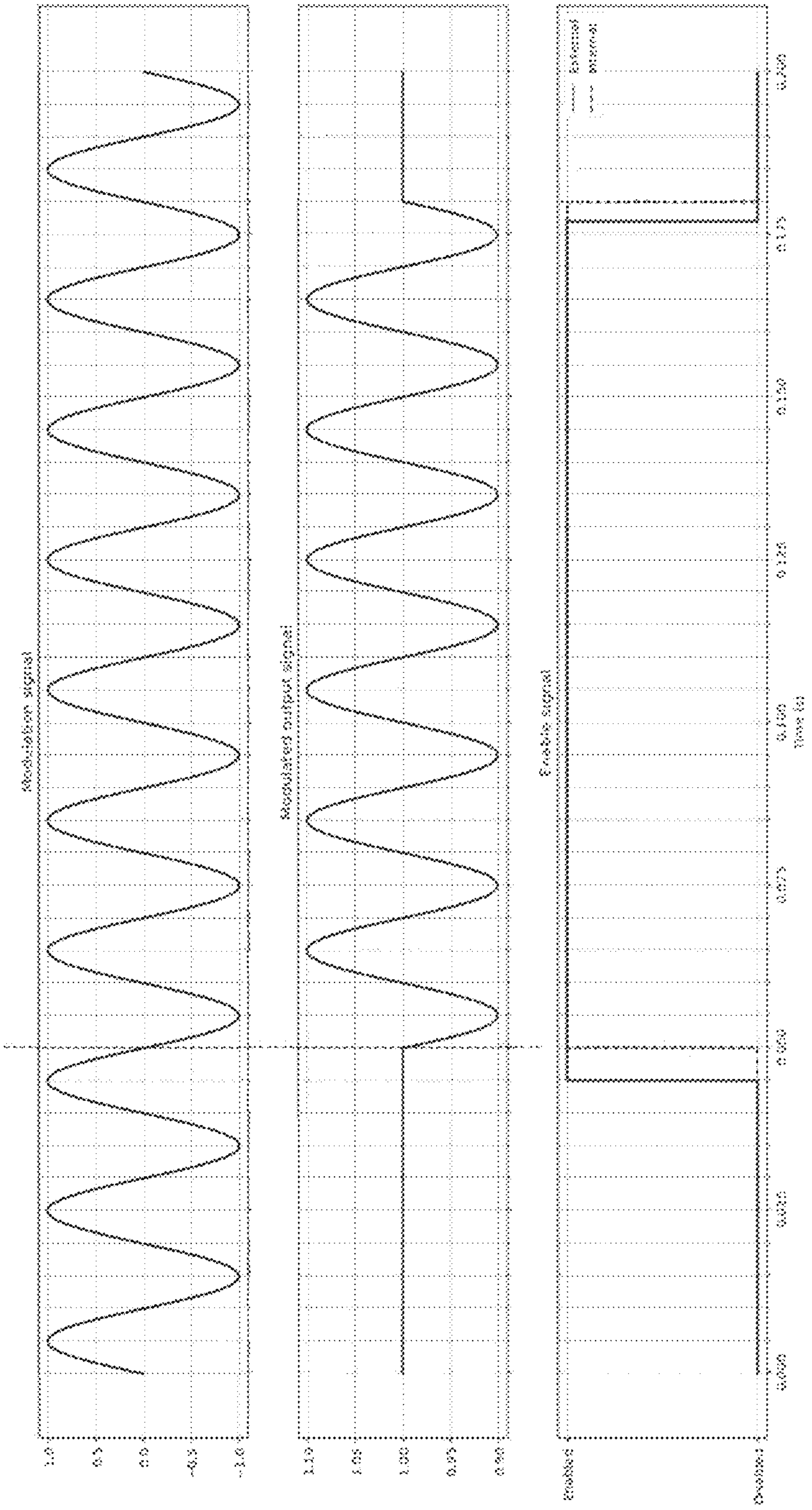
FIG. 5 shows a schematic representation of a modulation signal, a modulated signal and an enable/disable signal according to an embodiment of the invention.

FIG. 5 shows a schematic representation of a modulation signal, a modulated signal, and an enable/disable signal according to an embodiment of the invention.

In order to solve the problems which were illustrated with reference to FIG. 4, according to an embodiment of the invention, the disabling/enabling of this periodic modulation signal can only done at low amplitude of this modulation signal. Ideally, it is the zero crossing of this periodic modulation signal (see FIG. 5). In particular, the disabling/enabling is only done in the next following time period of the periodic signal, in which the amplitude of the periodic signal is, for example, less than 10% of the maximum amplitude.

Typically, this leads to a delay (waiting) until the amplitude has decreased to the predefined threshold. This leads, at the end, to a reduction of the visible light output variation upon enabling/disabling of the periodic modulation signal.

The frequency or switching off threshold represent the operation parameter of the switched converter determining the power provided at the output of the switched converter.

Moreover, the disabling/enabling may represent any modification of a parameter of the periodic modulation signal, which could also be, for example, a change of the frequency or amplitude of the periodic modulation signal.

Figure 6:
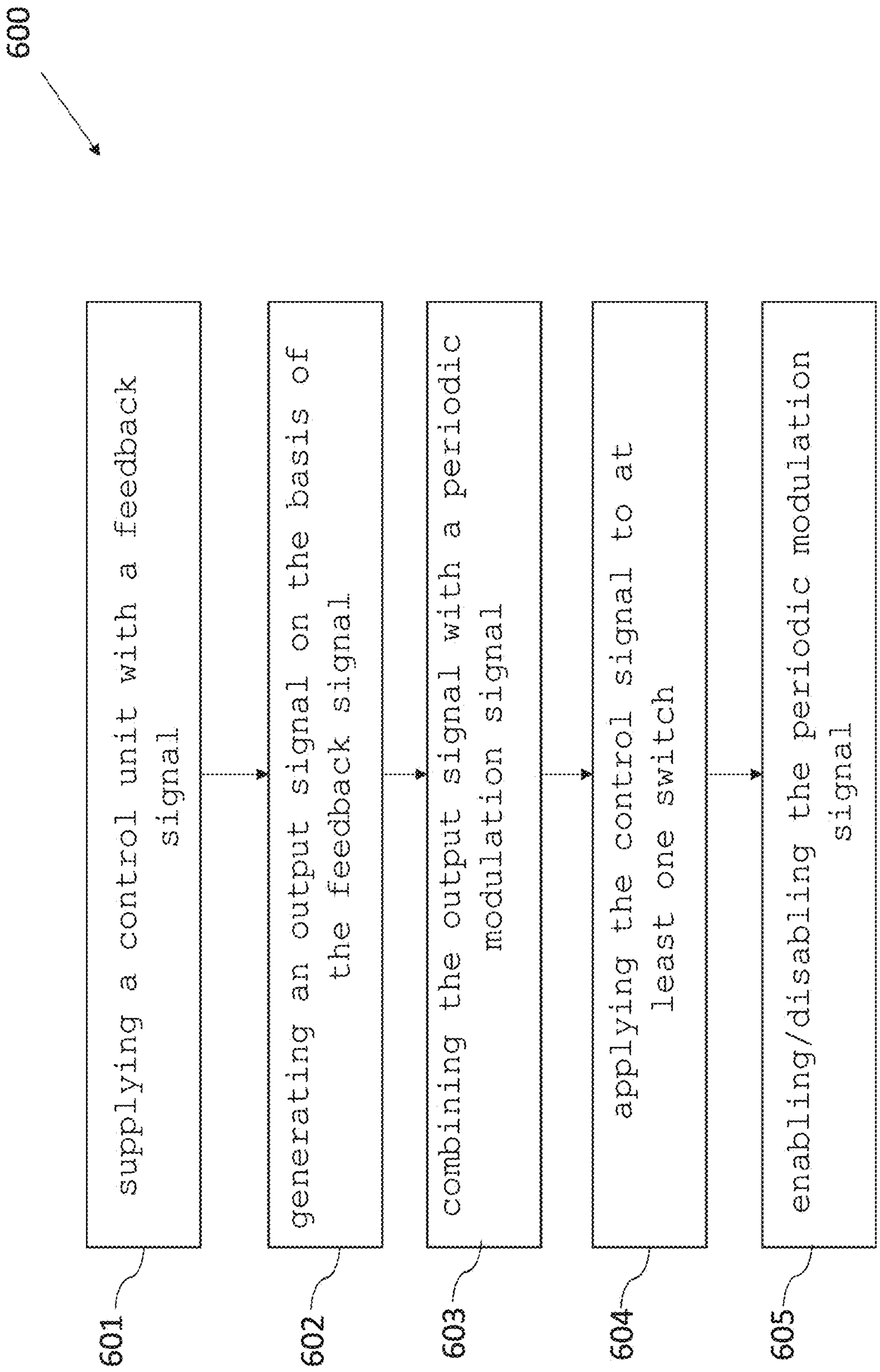
FIG. 6 shows a schematic representation of a method for switching a switched converter according to an embodiment of the invention.

FIG. 6 shows a schematic representation of a method 600 for switching a switched converter 101 for supplying a LED load 102 according to an embodiment of the invention.

The method 600 comprises the steps of:
- supplying 601 a control unit with a feedback signal indicating a load current of the LED load 102;
- generating 602 an output signal on the basis of the feedback signal;
- combining 603 the output signal with a periodic modulation signal in order to obtain a control signal, the control signal being configured to set an operation parameter of the at least one switch 103;
- applying 604 the control signal to at least one switch 103 of the switched converter 101.

In one embodiment, the enabling/disabling 605 the periodic modulation signal only at time periods in which an amplitude of the periodic modulation signal is lower than an amplitude threshold or at first time periods of the periodic modulation signal being centered at zero-crossings of the periodic modulation signal, these first time periods being separated from each other by time periods in which no enabling/disabling of the modulation signal is performed.

In an alternative embodiment, the means for enabling/disabling the periodic modulation signal is configured to detect a change in a sign of the modulation signal. The change enable/disable signal thus is delayed until the next zero-crossing event of the modulation signal and will be executed upon detection of the zero-crossing.

In particular, the means for enabling/disabling the periodic modulation signal is configured to detect the change in the sign by detecting that the sign of the measured signal or modulation signal changes from positive to negative values, or vice versa, during the crossing of the zero point. Since a digital evaluation of the signals is performed (sensing by an analog-to-digital converter (ADC) and digital processing of the signals) such evaluation is, advantageously, easy to implement.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. A feedback-controlled switched converter (101), comprising:
- at least one switch (103);
- output terminals (102*a*, 102*b*) for supplying an LED load (102);
- a control unit (104) being supplied with a feedback signal indicating a load current of the LED load (102), wherein the control unit (104) is configured to:
  - generate an output signal on the basis of the feedback signal;
  - combine the output signal with a periodic modulation signal in order to obtain a control signal, the control signal being configured to set an operation parameter of the at least one switch (103);
  - apply the control signal to the at least one switch (103);
- means for enabling/disabling the periodic modulation signal,
  - wherein the means for enabling/disabling is configured to enable/disable the periodic modulation signal only at time periods of the periodic modulation signal in which an amplitude of the periodic modulation signal is lower than an amplitude threshold, or
  - wherein the means for enabling/disabling the periodic modulation signal is configured to only enable/disable the periodic modulation signal at first time periods of the periodic modulation signal being centered at zero-crossings of the periodic modulation signal, these first time periods being separated by second time periods centered around the peaks of the periodic modulation signal and in which no enabling/disabling of the periodic modulation signal is performed, or
  - wherein the means for enabling/disabling the periodic modulation signal is configured to only enable/disable the periodic modulation signal as soon as zero-crossing detection means of the converter indicate a zero-crossing of the modulation signal.

2. The feedback-controlled switched converter (101) of claim 1, wherein the periodic modulation signal is disabled when the load at the output terminals (102*a*, 102*b*) is low and enabled when the load at the output terminals (102*a*, 102*b*) is high.

3. The feedback-controlled switched converter (101) of claim 1, wherein the switched converter (101) further comprises a signal generator (200), wherein the signal generator (200) is configured to generate the periodic modulation signal.

4. The feedback-controlled switched converter (101) of claim 1, wherein the periodic modulation signal is derived from a signal within the converter (101), such as e.g. a ripple in the DC supply voltage of the converter (101).

5. The feedback-controlled switched converter (101) of claim 1, wherein the means for enabling/disabling the periodic modulation signal is configured to detect a maximum amplitude of the periodic modulation signal and wherein the amplitude threshold is less than 10% of the maximum amplitude of the periodic modulation signal.

6. The feedback-controlled switched converter (101) of claim 1, wherein the periodic modulation signal is a triangle waveform or a sinusoidal waveform.

7. The feedback-controlled switched converter (101) of claim 1, wherein the periodic modulation signal is based on an inverted input voltage of the switched converter.

8. The feedback-controlled switched converter (101) of claim 1, wherein the operation parameter of the switched converter (101), such as a switching frequency or a peak current value of the switched converter, is configured to determine a power provided at the terminals (102*a*, 102*b*) for supplying the LED load (102).

9. The feedback-controlled switched converter (101) of claim 1, wherein the control unit (104) comprises a proportional integral, PI, regulator.

10. The feedback-controlled switched converter (101) of claim 1, wherein the converter (101) is an LLC converter, flyback converter or buck converter.

11. LED lighting means (101) comprising the feedback-controlled switched converter (101) according to claim 1 and an LED load (102) connected to said output terminals (102*a*, 102*b*) of the switched converter (101).

12. A method (600) for switching a feedback-controlled switching converter (101) for supplying an LED load (102), comprising the steps of:

supplying (601) a control unit (104) with a feedback signal indicating a load current of the LED load (102);

generating (602) an output signal on the basis of the feedback signal;

combining (603) the output signal with a periodic modulation signal in order to obtain a control signal, the control signal being configured to set an operation parameter of the at least one switch (103);

applying (604) the control signal to at least one switch (103) of the switched converter (101);

enabling/disabling (605) the periodic modulation signal only at first time periods of the periodic modulation signal being centered at zero-crossings of the periodic modulation signal, the first time periods being separated from each other by second time periods in which no enabling/disabling is performed of the periodic modulation signal, or enabling/disabling (605) the periodic modulation signal upon detection of a zero-crossing of the modulation signal.

13. The method (600) of claim 12, wherein the method (600) further comprises the step of:

generating the periodic modulation signal by a signal generator in the switched converter (101).

14. The method (600) of claim 12, wherein the method further comprises the step of:

deriving the periodic modulation signal from a signal within the converter (101), such as e.g. a ripple in the DC supply voltage of the switched converter (101).

15. The method (600) of claim 12, wherein the method (600) further comprises the step of:

detecting a maximum amplitude of the periodic modulation signal, wherein the amplitude threshold is less than 10% of the maximum amplitude of the periodic modulation signal.

* * * * *